Dec. 1, 1953  G. E. HIEBER  2,660,738
METAL-WORKING MACHINE
Filed Oct. 15, 1947  10 Sheets-Sheet 1

Inventor
GEORGE E. HIEBER
By Strauch & Hoffman
Attorney

Dec. 1, 1953 G. E. HIEBER 2,660,738
METAL-WORKING MACHINE
Filed Oct. 15, 1947 10 Sheets-Sheet 3

Inventor
GEORGE E. HIEBER
By Strauch & Hoffman
Attorney

Dec. 1, 1953  G. E. HIEBER  2,660,738
METAL-WORKING MACHINE
Filed Oct. 15, 1947  10 Sheets-Sheet 4
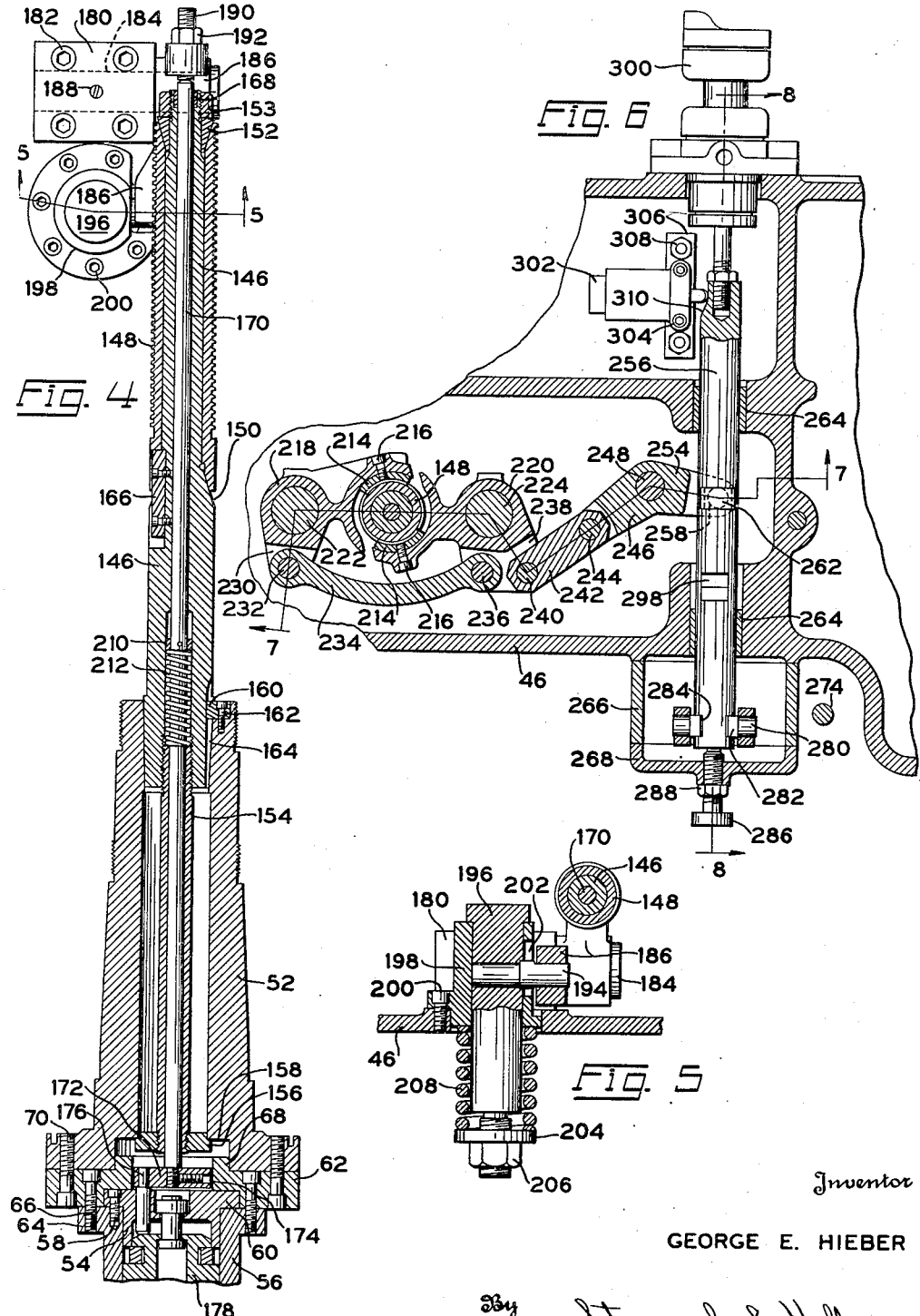
Inventor
GEORGE E. HIEBER
By Strauch & Hoffman
Attorney Dec. 1, 1953             G. E. HIEBER            2,660,738
METAL-WORKING MACHINE
Filed Oct. 15, 1947                                    10 Sheets—Sheet 5
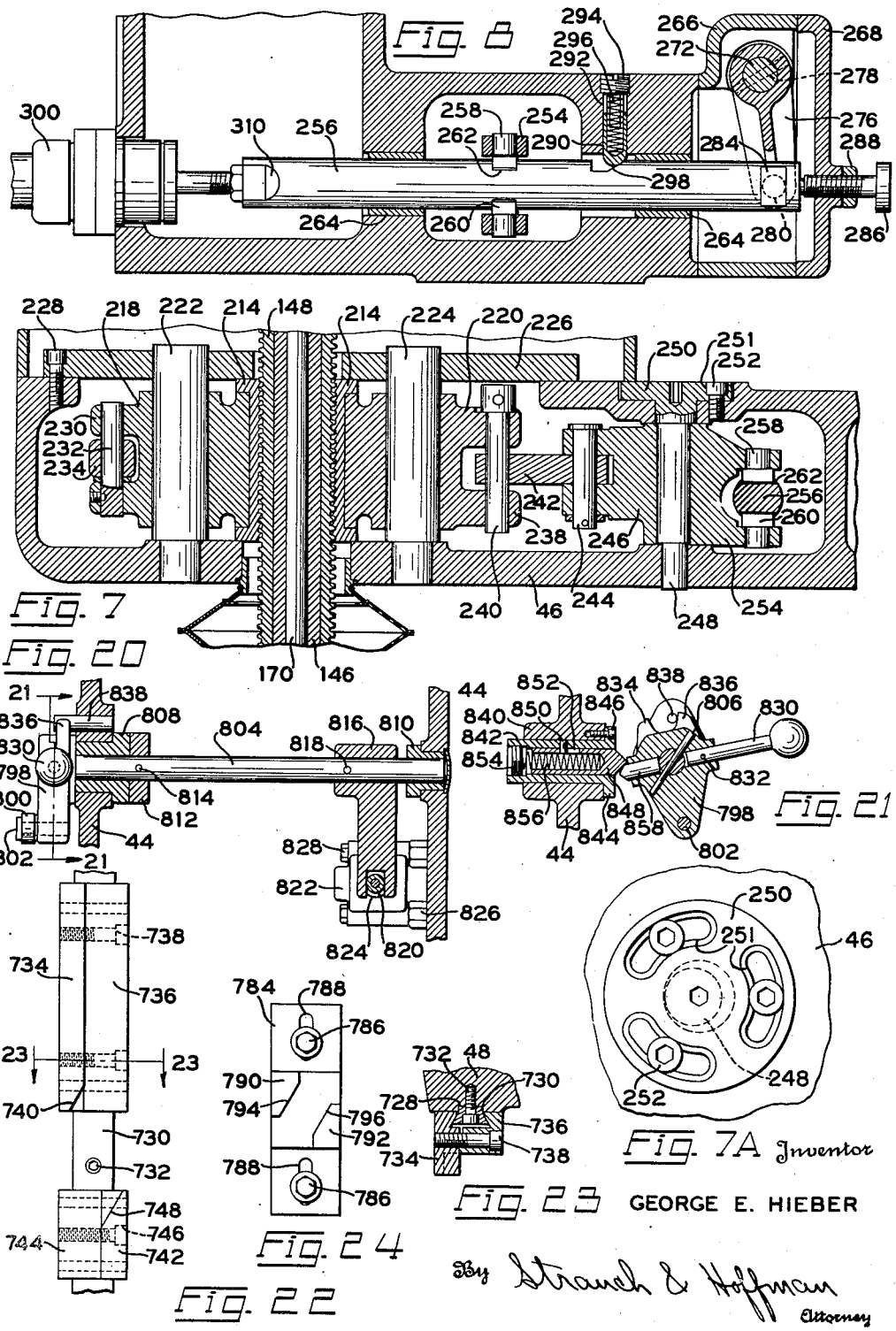
Inventor
GEORGE E. HIEBER
By Strauch & Hoffman
Attorney

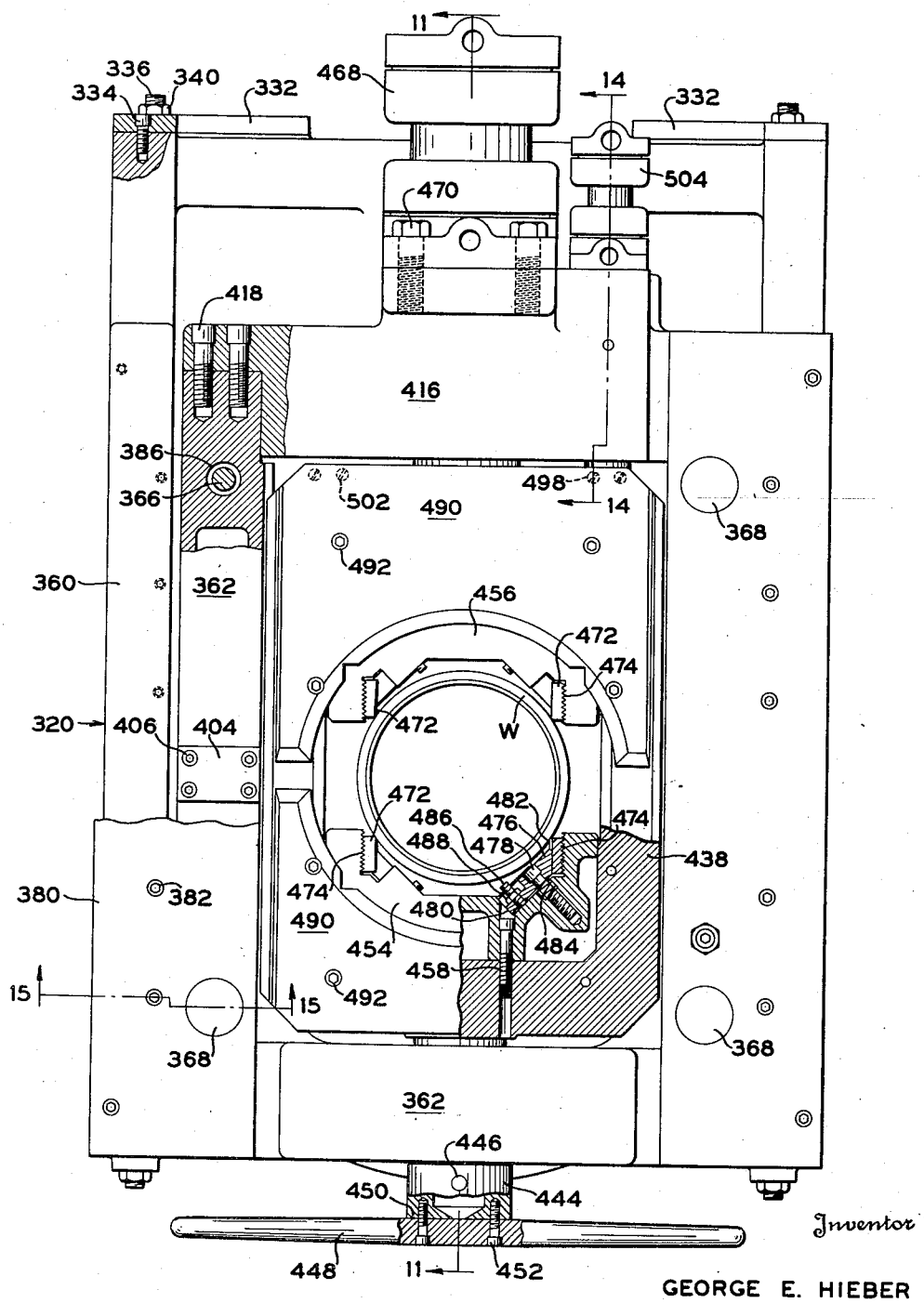

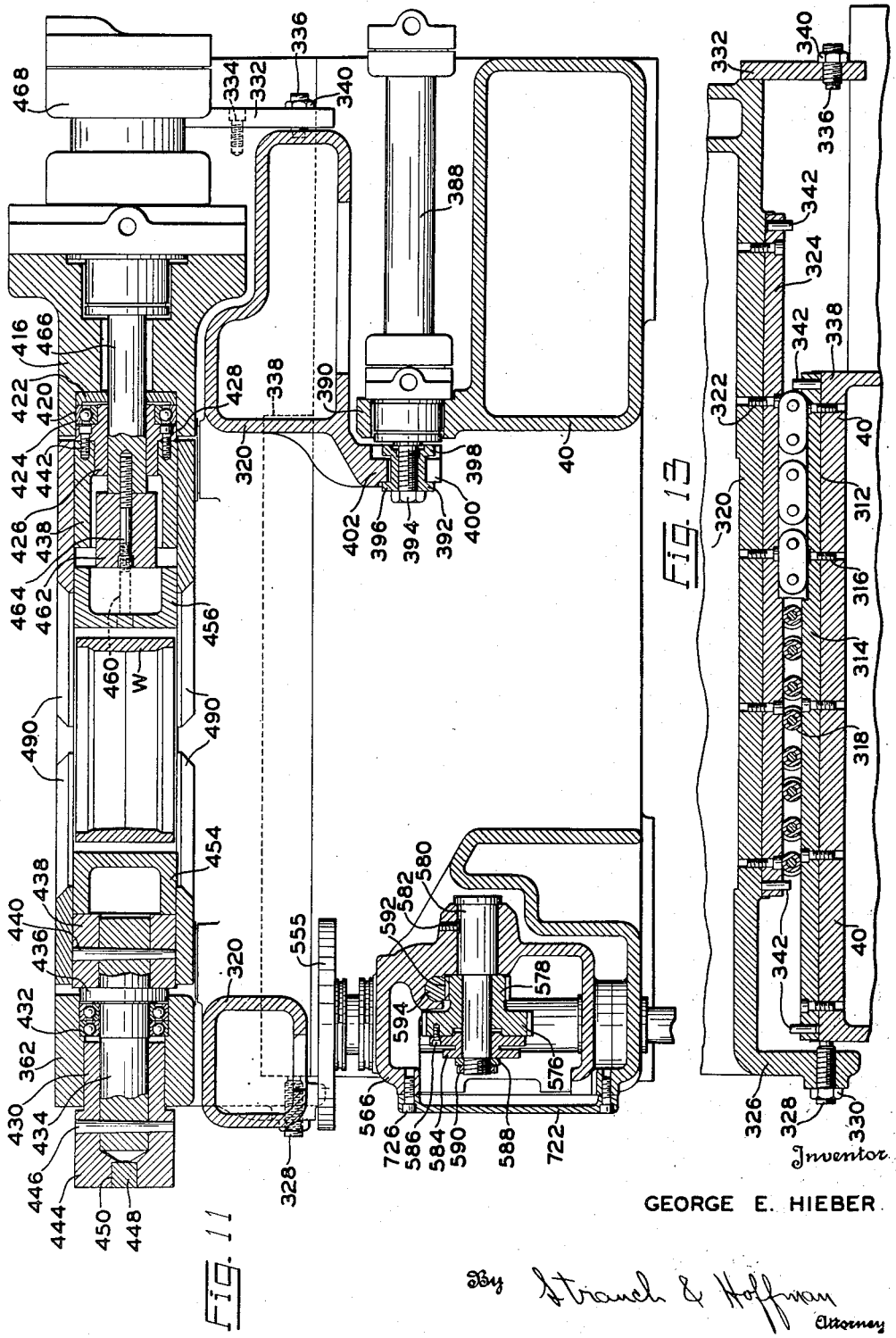

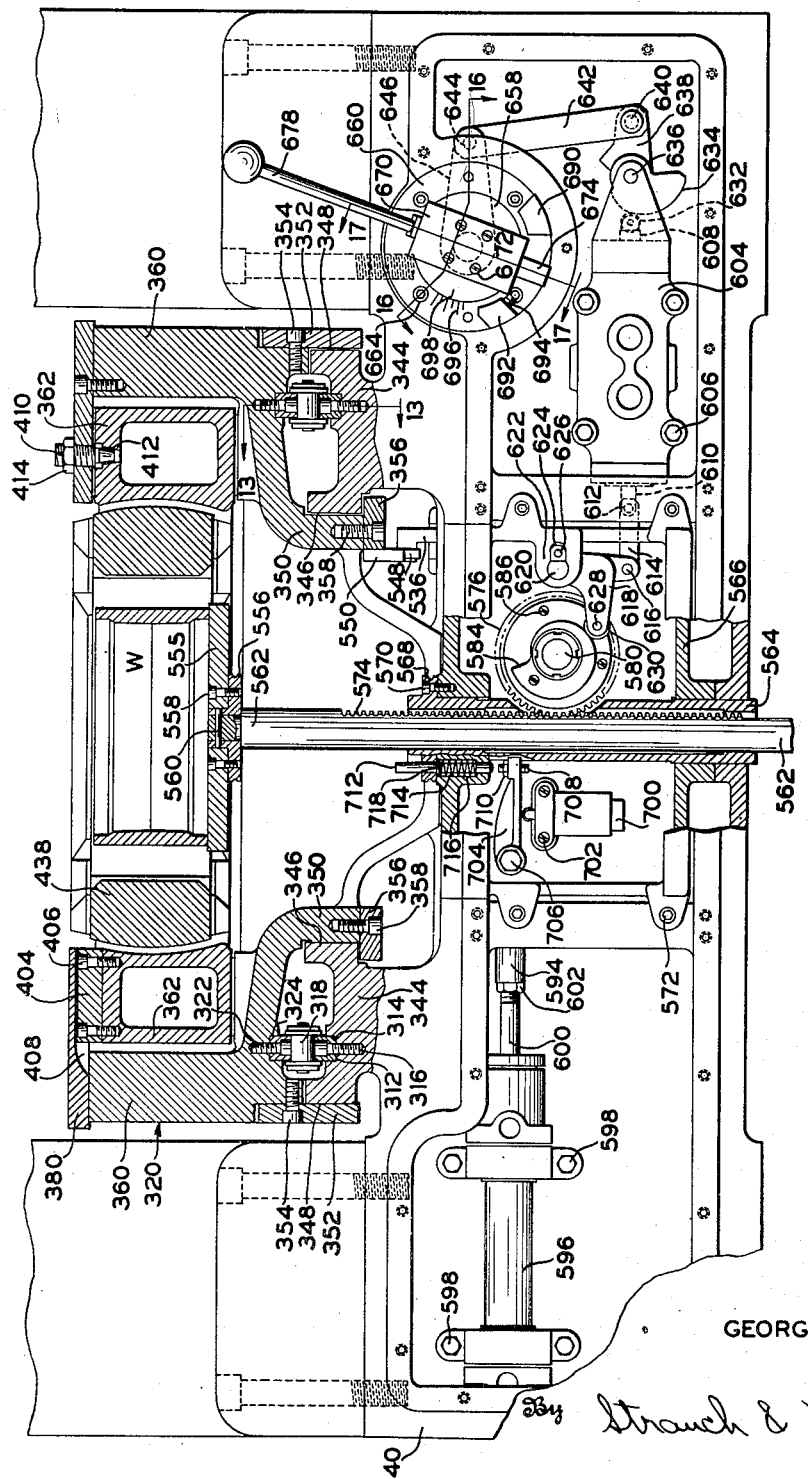

Dec. 1, 1953     G. E. HIEBER     2,660,738
METAL-WORKING MACHINE
Filed Oct. 15, 1947     10 Sheets-Sheet 9
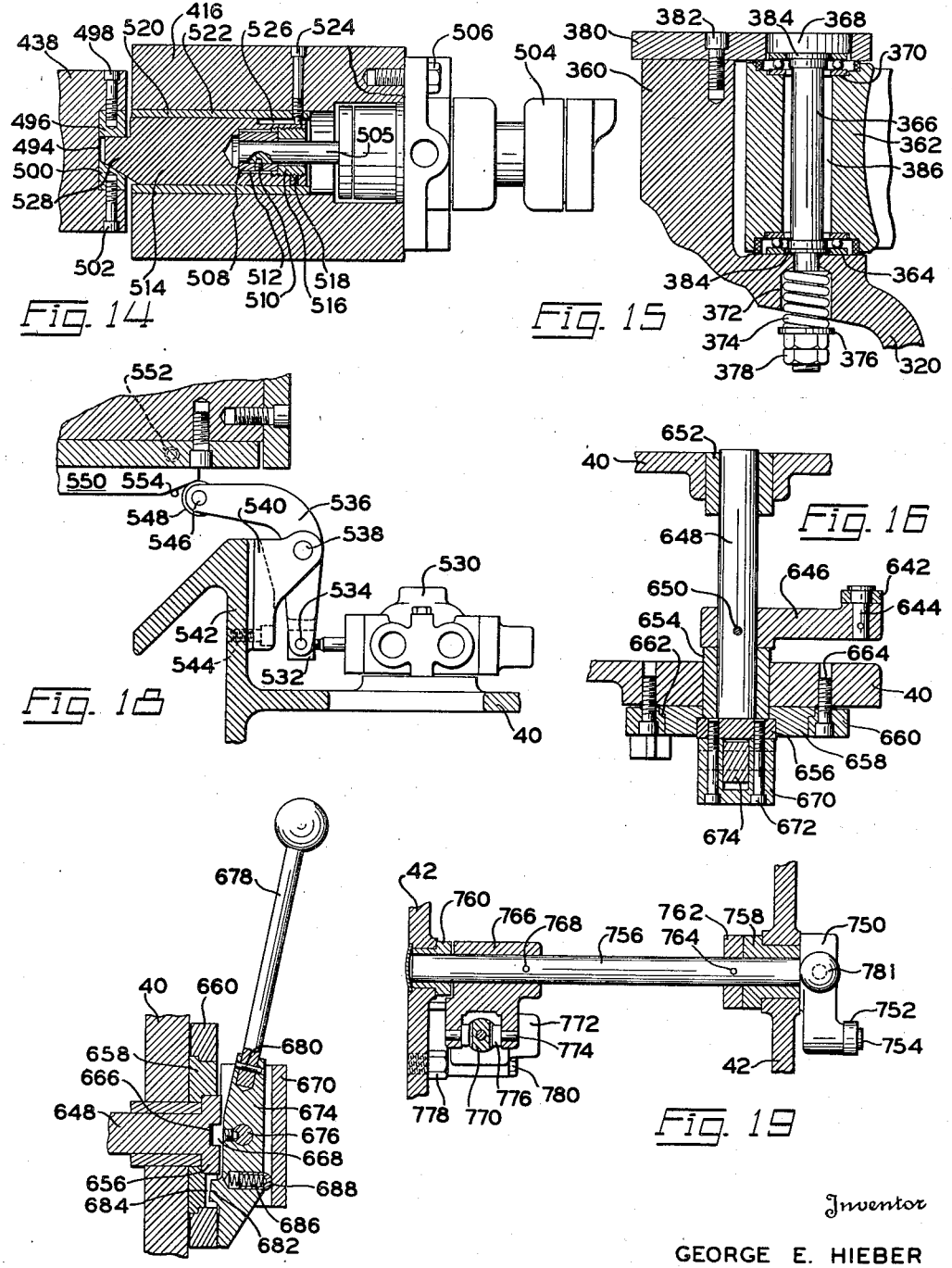
Inventor
GEORGE E. HIEBER

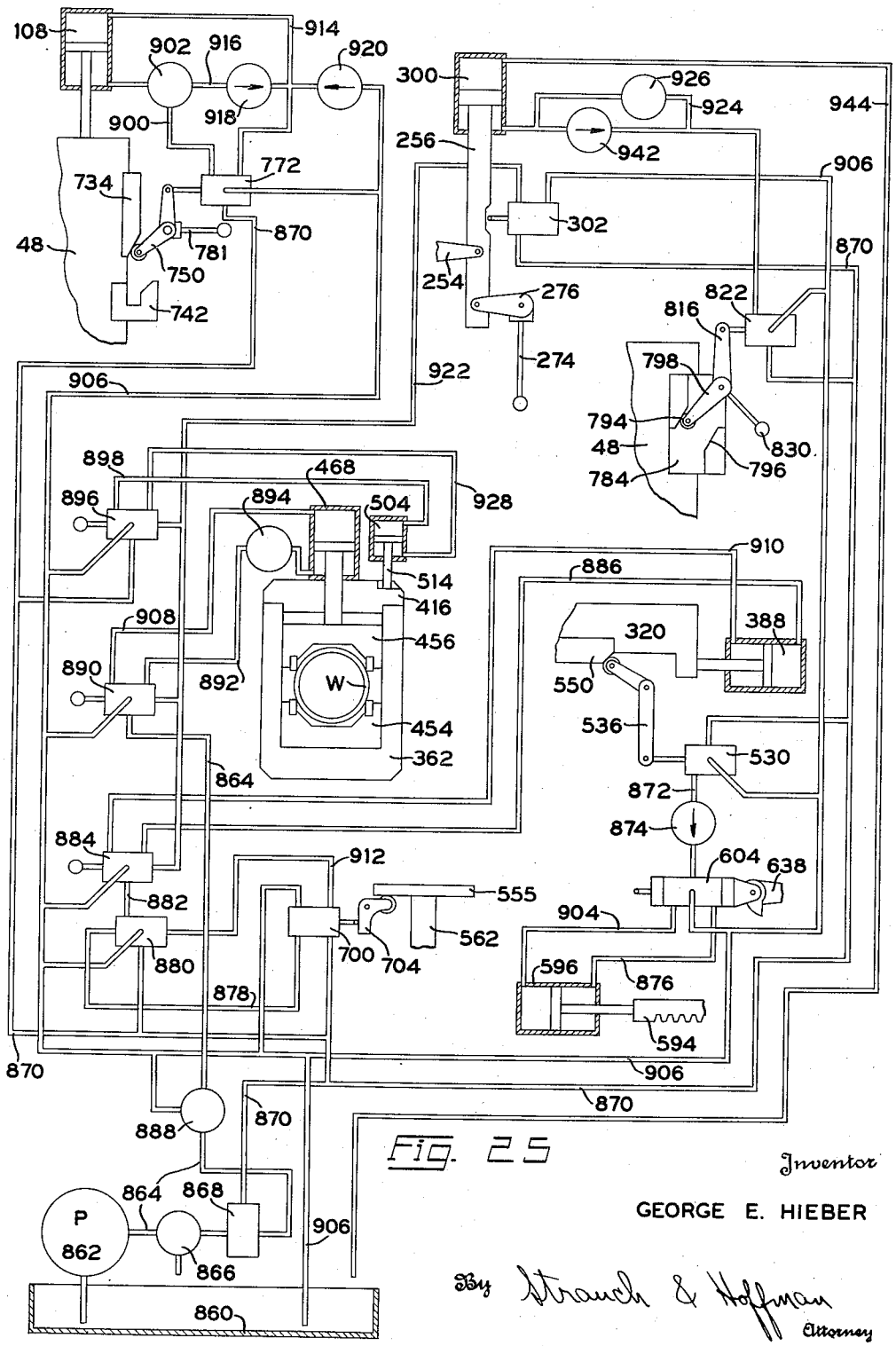

Patented Dec. 1, 1953

2,660,738

UNITED STATES PATENT OFFICE 2,660,738

METAL-WORKING MACHINE

George E. Hieber, Waynesboro, Pa., assignor to Landis Machine Company, Waynesboro, Pa., a corporation of Pennsylvania Application October 15, 1947, Serial No. 779,926

11 Claims. (Cl. 10—129)

This invention relates to metal working machines and more particularly to a machine for the tapping of pipe couplings and the like.

An object of this invention is the provision of an improved semi-automatic machine for tapping couplings and the like which will achieve the maximum production of accurately threaded articles at a minimum cost.

Another object of the invention is to provide hydraulic operation for all heavy mechanisms of the machine, thus reducing operator fatigue.

A further object is to provide a machine wherein the controls for such hydraulic operation are interlocked to prevent their actuation except in proper timed sequence.

Another object of the invention is to provide a coupling tapping machine in which a replaceable leadscrew is coaxial with the tapping spindle thus eliminating the usual gearing between these elements.

A further object is to provide a work locating mechanism which is adjustable in infinitely small increments within a given range of coupling lengths and thread lengths and which will also facilitate the loading and unloading of heavy couplings.

Still another object is to provide improved automatic means for performing various of the operations in the working cycle such as stopping the tap on its approach to the work, disengaging the lead screw nuts, resetting the tap, etc.

The machine described in this specification is intended for use upon the larger sizes of pipe couplings and is therefore of rugged construction and many of the moving parts are necessarily heavy. Hence hydraulic or other fluid means of operation is most desirable. At the same time, fully automatic operation is undesirable. The necessary controls and other automatic mechanisms add greatly to the first cost of such a machine and do not appreciably improve the quantity of production thereof. For example, in the present invention, the leadscrew nuts are engaged upon the leadscrew manually, thus eliminating the complex and expensive timer mechanism employed when such engagement is accomplished by hydraulic or other automatic means. Moreover, there is no difference in the time required to accomplish this operation whether by manual or automatic means.

Nor is the operator constantly tied to one machine. On the larger sizes of couplings, the time required for the actual tapping may be 9 or 10 minutes out of a total cycle time of approximately 12 minutes. During the actual thread cutting operation, the tap is driven by the leadscrew and the operator's attention is not required for this large portion of the cycle time. Such time may then be used for loading and starting the threading cycle on other machines.

For the above reasons, the machine is largely hand controlled and hydraulically operated with certain necessary automatic mechanisms, although methods of rendering the machine fully automatic will readily suggest themselves to those skilled in the art.

In the accompanying drawings there is shown for purposes of illustration a preferred embodiment of the present invention, it being understood that the drawings do not define the limits of the invention as changes in the construction and operation disclosed therein may be made without departing either from the spirit of the invention or scope of the claims.

In the drawings:

Figure 4 is a vertical sectional view taken on line 4—4 of Figure 3;

Figure 5 is a fragmentary sectional view taken on line 5—5 of Figure 4;

Figure 6 is a fragmentary sectional view taken on line 6—6 of Figure 3;

Figure 7 is a fragmentary sectional view taken on line 7—7 of Figure 6;

Figure 7a is a detail plan view of certain of the parts shown in Figure 7.

Figure 8 is a fragmentary sectional view taken on line 8—8 of Figure 6;

Figure 9 is a front elevation of a part of the machine, partially in section;

Figure 10 is a plan view of the work-holding chuck and associated parts partially in section;

Figure 11 is a vertical sectional view taken on line 11—11 of Figure 10 and showing the chuck in threading position;

Figure 12 is a front elevation of the base portion of the machine, partially in section and showing the chuck and locating device in loading position;

Figure 13 is a fragmentary sectional view taken substantially on line 13—13 of Figure 12;

Figure 14 is a fragmentary sectional view taken substantially on line 14—14 of Figure 10;

Figure 15 is a fragmentary sectional view taken on line 15—15 of Figure 10;

Figure 16 is a fragmentary sectional view taken substantially on line 16—16 of Figure 12;

Figure 17 is a fragmentary sectional view taken substantially on line 17—17 of Figure 12;

Figure 18 is a fragmentary vertical transverse section showing the operation of one of the control valves by the carriage;

Figure 19 is a fragmentary sectional view taken on line 19—19 of Figure 2;

Figure 20 is a fragmentary sectional view taken on line 20—20 of Figure 2;

Figure 21 is a fragmentary sectional view taken on line 21—21 of Figure 20;

Figure 22 is a detail elevation of the cams for controlling rapid traverse of the tap;

Figure 23 is a fragmentary sectional view taken on line 23—23 of Figure 22;

Figure 24 is a detail elevation of the cam controlling disengagement of the leadscrew nuts; and Figure 25 is a diagram of the hydraulic control circuit.

Figure 1:
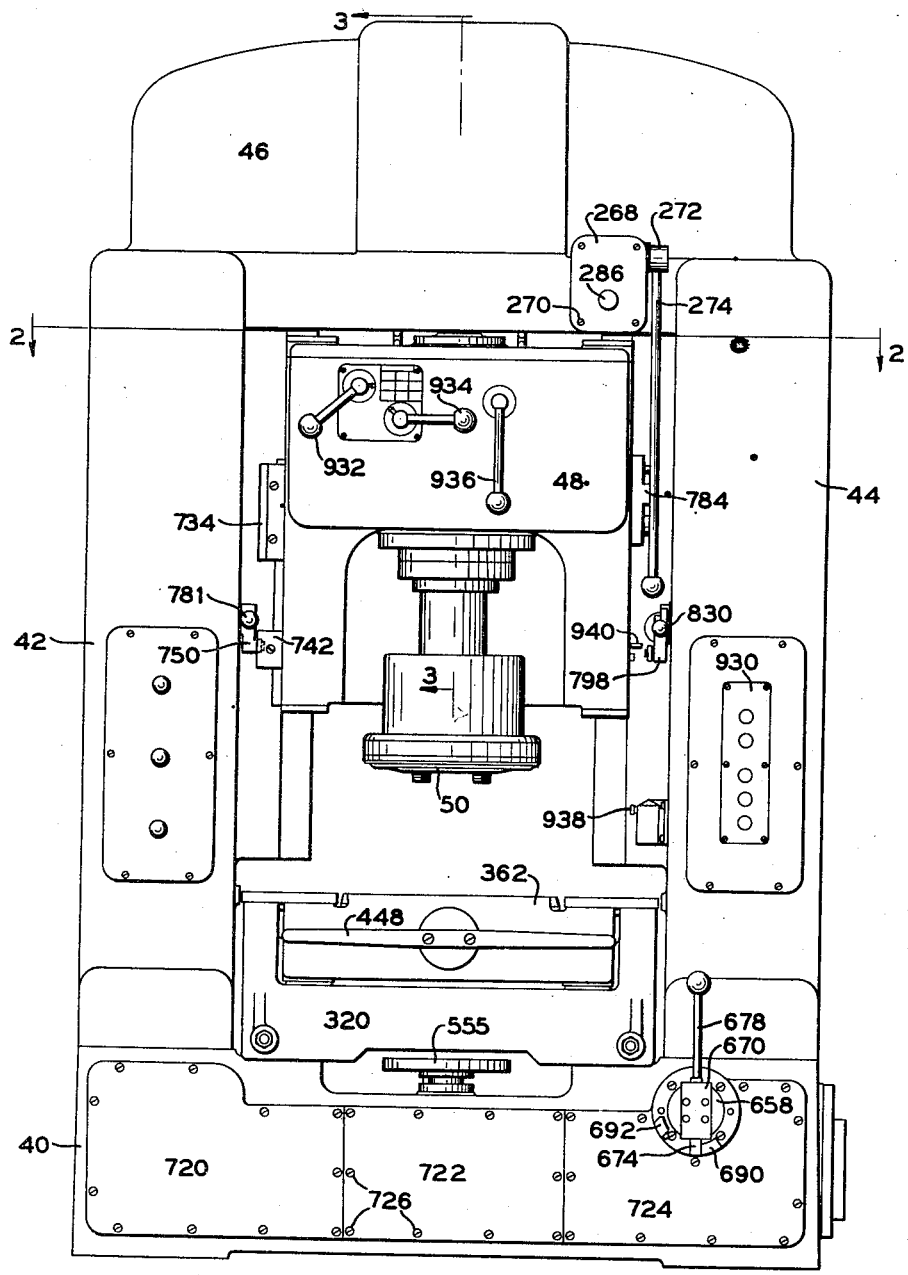
Figure 1 is a front elevation of the entire machine.

The machine comprises a base 40 (Figure 1) supporting, on opposite sides a pair of columns 42 and 44. An arch 46 is mounted on the upper ends of columns 42, 44 thus forming a substantially rectangular space in the center of the machine wherein is mounted in a manner later to be described, a gear box 48 which supports the tool or tap 50.

Any collapsible, taper producing tap may be used with the machine. The tap 50 shown in the drawings is shown and described in United States Patent No. 2,291,744, issued to Frederic Nell.

Figure 3:
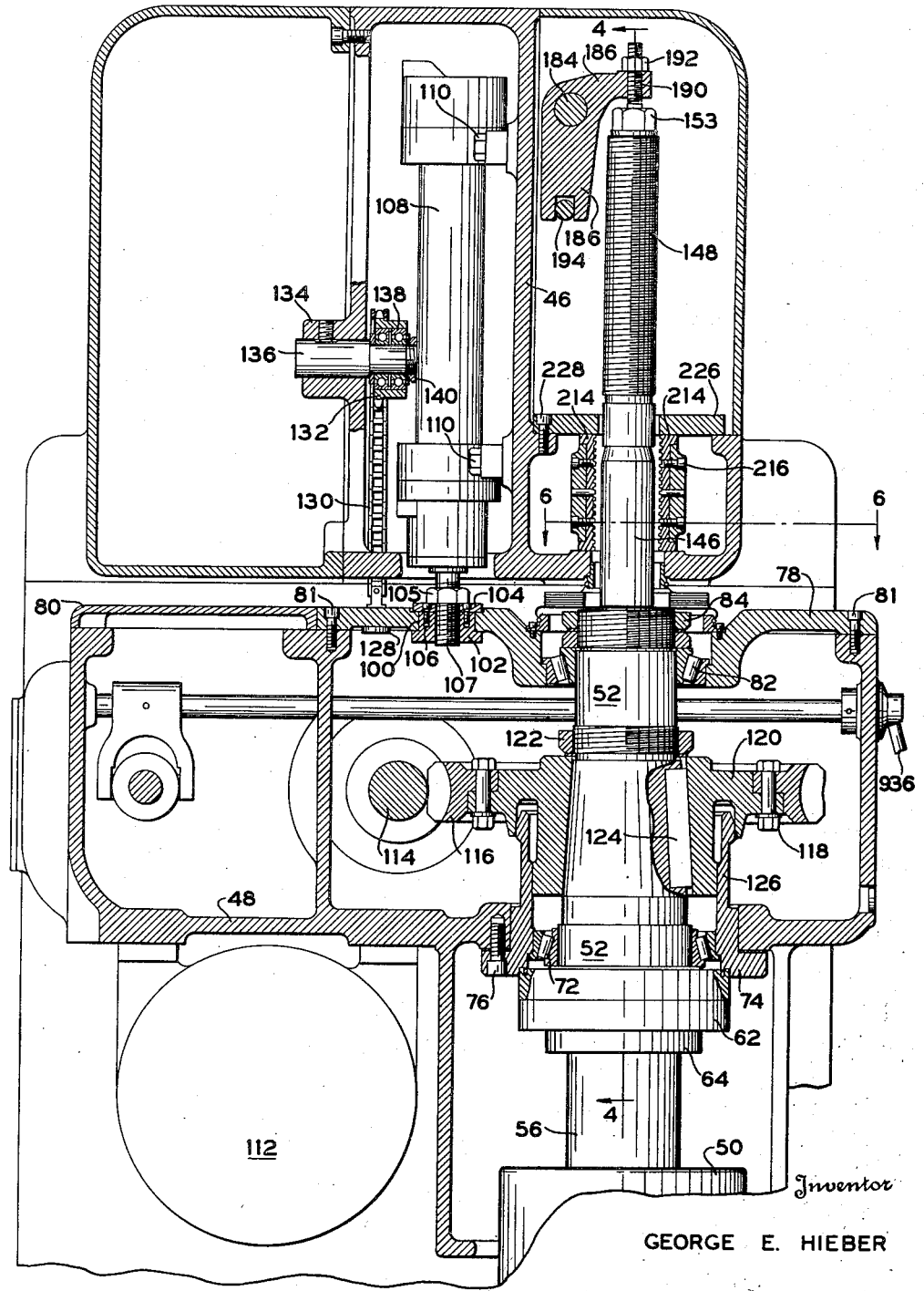
Figure 3 is a vertical sectional view of the upper portion of the machine taken substantially on line 3—3 of Figure 1.

The collapsible tap 50 is removably secured to a spindle 52 as shown in Figures 3 and 4. The rear end of the tap is provided with an adapter element 54 which is secured to a body member 56 of the tap by screws 58. To ensure concentricity between tap 50 and spindle 52, adapter 54 is provided with a rear flanged portion 60 which is received in a corresponding recess in an attaching flange 62. To further secure the tap 50 to flange 62, the body 56 is provided with a rear flanged portion 64 to which flange 62 is secured by screws 66.

Concentricity between flange 62 and spindle 52 is obtained by providing flange 62 with a rear boss portion 68 which is received in a corresponding recess in the lower end of spindle 52. Flange 62 is further secured to the lower flanged end of spindle 52 by means of the screws 70.

The lower end of spindle 52 is journalled for rotation in a suitable anti-friction bearing 72 which is contained in a bearing housing 74. A plurality of screws 76 are employed to secure bearing housing 74 in an opening in the bottom wall of gear box 48. As shown in Figure 3, gear box 48 is provided with a top cover in two sections 78 and 80, which are secured to gear box 48 by screws 81. Cover section 78 supports in an opening therein a second anti-friction bearing 82 through which the reduced-diameter upper end of spindle 52 is journalled for rotation. Spindle 52 and tap 50 are secured in correct axial position in gear box 48 by means of lock nuts 84 threadedly engaged upon the upper extremity of spindle 52 and abutting bearing 82.

Figure 2:
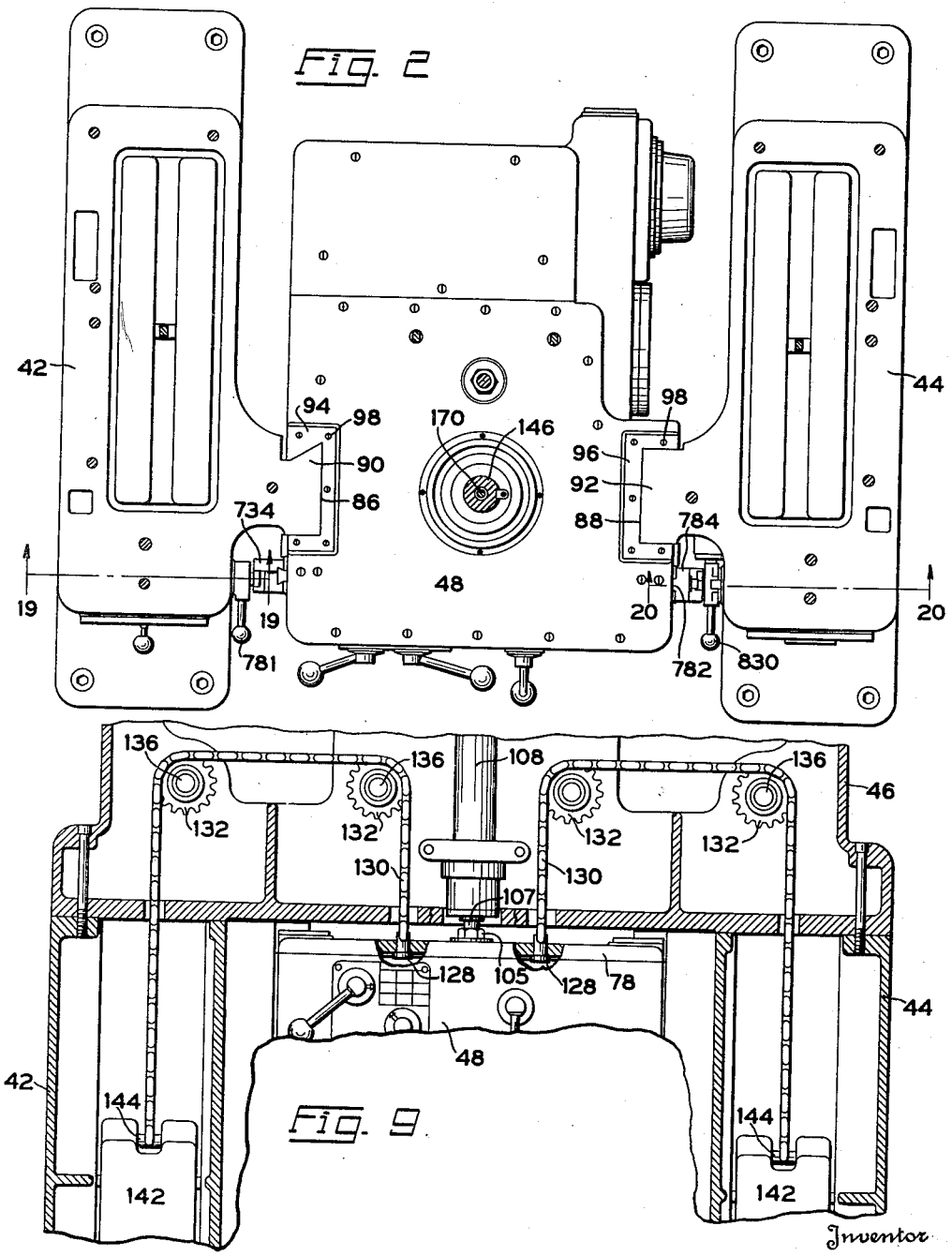
Figure 2 is a horizontal sectional view of the machine taken substantially on line 2—2 of Figure 1.

Reference to Figure 2 will show that gear box 48 is provided, along the sides thereof, with vertically extending guideways 86 and 88 which are adapted to engage vertical guides 90 and 92 formed along the inwardly facing walls of columns 42 and 44 respectively. Thus free linear movement of gear box 48 and all parts attached thereto, in a vertical direction, is permitted. Guideways 86 and 88 may be provided with hardened wear strips as is well understood in the art. Wiper members 94 and 96 may also be secured by screws 98 to both ends of guideways 86 and 88 to prevent the entrance of foreign matter between the relatively sliding surfaces.

As shown in Figure 3, cover member 78 is provided with a counterbored opening 100 in which a nut member 102 is seated. Nut 102 is retained in opening 100 by a plate 104 and screws 106. The piston rod 107 of a hydraulic cylinder 108 is threadedly engaged in nut 102 while said cylinder 108 is secured by screws 110 to the interior of the forward wall of arch 46. Nut 105 on rod 107 threaded against plate 104 prevents relative rotation between the piston rod and nut 102. Therefore it will be seen that gear box 48 may be moved vertically on guides 90 and 92 by the action of cylinder 108.

An electric motor 112 is secured in the conventional manner to the underside of the rear portion of gear box 48 as shown and is employed to drive a worm 114 through a series of change-speed gears and clutch (not shown). Worm 114 is in constant mesh with a worm gear 116 which is secured by bolts 118 to a hub 120. Hub 120 is mounted on a tapered portion of spindle 52 and is retained in position axially by a lock nut 122 which is threadedly engaged on spindle 52 upwardly adjacent hub 120. A key 124 provides a means whereby spindle 52 may be driven by worm gear 116. It should be noted that bearing housing 74 is provided with an integral upward extension 126 which surrounds a portion of hub 120 to prevent escape of lubricant contained in the lower portion of gear box 48.

As shown in Figures 3 and 9, a pair of headed pins 128 are mounted in the gear box cover plate 78 and are attached at their upper ends to chains 130 each of which passes over spaced sprockets 132. The rear wall of arch 46 is provided with bosses 134 (Figure 3) to receive sprocket studs 136. Anti-friction bearings 138 are mounted on studs 136 on the interior of the wall of arch 46 and carry the sprockets 132. Lock nuts 140 are engaged upon the forward ends of studs 136 to retain bearings 138 in axial position.

After engaging sprockets 132, chains 130 extend downwardly into the respective columns 42 and 44 where each is secured to a counterweight 142 by means of a pin 144. The total weight of counterweights 142 should only slightly overbalance the total weight of gear box 48, tap 50 and motor 112 so that the work required to move the gear box, etc., will be reduced nearly to zero.

Referring to Figures 4 and 5, the interior of the upper end of spindle 52 is tapered upwardly and outwardly to receive a complementary tapered end of a spindle extension member 146. A tubular leadscrew 148 is mounted upon the upper reduced-diameter portion of extension member 146 and its lower interiorly tapered end engages a conical shoulder 150 on member 146. The interior of the upper end of leadscrew 148 is also formed conically to receive a frusto-conical bushing 152. A nut 153 is threadedly engaged upon the upper extremity of extension 146 to produce a wedging action between bushing 152 and shoulder 150 and thereby retain leadscrew 148 in position on extension 146. A tube 154 is threadedly engaged in the interior of the lower end of extension 146 and extends downwardly inside spindle 52 to engage similarly a support member 156. Thus tube 154 acts as a drawbar to hold member 156 against shoulder 158 in the interior of spindle 52 and to hold extension 146 rigidly in its seat in the top of said spindle.

A key 160 is secured in a recess in the top end of spindle 52 by screw 162 and extends into keyway 164 in extension 146 thus insuring unitary rotary movement of these parts. A key 166 is secured to extension 146 to engage a slot in the lower end of leadscrew 148 and thus provide for the unitary rotation of extension 146 and leadscrew 148.

Extension 146 is provided at its upper end with a recess to receive a bushing 168. A rod 170 is journalled through bushing 168 and extends downwardly through the interior of extension 146 and tube 154. A plate 172 is threadedly engaged on the lower end of rod 170 and is located between support member 156 and flanged portion 60 of adapter element 54 for axial movement in boss 68 on flange 62. Relative rotation between plate 172 and rod 170 is prevented by a radially directed set screw 174 threaded into plate 172 and engaging the threaded end of rod 170. One or more pins 176 are frictionally mounted in plate 172 and extend downwardly therefrom through suitable openings in adapter member 54 toward the rear end of tap sleeve member 178.

The tap mechanism is reset after a tapping operation by means of a mechanism comprising a block 180 which is secured near the top of the forward wall of arch 46 by screws 182 (Figure 4). A shaft 184 is disposed transversely through block 180. A bell crank 186 is rockably mounted on shaft 184 adjacent one side of block 180 and the headed end of shaft 184 together with set screw 188 in block 180 retains bell crank 186 in correct axial position. One arm of bell crank 186 extends outwardly so as to be positioned directly over the upper end of rod 170. A set screw 190 is threaded through this arm of crank 186 and is adjustably retained in position by nut 192. Therefore, it is evident that, when gear box 48 and the parts associated therewith are at the top of their path of travel as shown in Figures 3 and 4, screw 190 engages the top end of rod 170.

The other end of crank 186 extends downwardly and is provided with a rectangular recess in the end thereof to engage a portion of a pin 194. This pin 194 is frictionally fitted transversely through a stud 196 (Figure 5) which is non-rotatably mounted in the bore of a bracket 198. Screws 200 attach bracket 198 to the forward wall of arch 46 downwardly adjacent to block 180. A slot 202 is provided in the side of bracket 198 to permit a limited amount of movement of pin 194 and consequently a limited amount of axial movement of stud 196.

Stud 196 extends rearwardly through the wall of arch 46 and on its threaded rearward end a washer 204 and nut 206 are mounted. A spring 208 surrounding stud 196 is adjustably held in compression between washer 204 and the rear face of bracket 198. Thus, it is seen that the action of spring 208 constantly urges pin 194 rearwardly and set screw 190 downwardly. When screw 190 engages the top end of rod 170, therefore, the force of spring 208 is transmitted through rod 170 to force pin 176 downwardly against tap sleeve member 178. As shown in the above mentioned Nell patent, such pressure against sleeve 178 results in the tap being reset to begin a threading operation.

A collar 210 is pinned to rod 170 and a spring 212 is retained in compression between collar 210 and the upper end of tube 154. Therefore, when the tap 50 and rod 170 are moved downwardly out of contact with the tap closing mechanism, the force of spring 212 is exerted to lift rod 170, plate 174 and pin 176 out of contact with tap sleeve 178 allowing the sleeve to move to collapsed or non-threading position.

The leadscrew nut mechanism is contained in the lower central portion of the arch 46 and is illustrated in Figures 3, 6, 7 and 8. The half-nuts 214 are formed internally with threads to mate with the external threads on leadscrew 148 and each is secured by screws 216 to one of a pair of bell cranks 218, 220. Cranks 218 and 220 are pivotally mounted by a pair of short shafts 222 and 224 respectively (Figure 7), both of which are journalled for rotation in the bottom wall of arch 46 and also in suitable openings in the cover plate 226 which is secured to the wall of arch 46 by screws 228.

An arm 230 of crank 218 is bifurcated and each division is provided with an opening to receive the pin 232 which is journalled therethrough. A link 234 connects pin 232 to another pin 236 similarly mounted in an arm of crank 220. Thus the pivotal movements of cranks 218 and 220 to engage and disengage the half-nuts 214 and leadscrew 148 are equal, opposite and simultaneous.

A bifurcated arm 238 of crank 220 supports the pin 240. Pin 240 is made easily removable for the replacement of the entire nut mechanism thus far described, as a unit when the leadscrew is to be changed for one of a different pitch. Between the divisions of arm 238 a link 242 is mounted on pin 240 to connect the latter to a pin 244 which is journalled through one arm of a bell crank 246. A stud 248 on which crank 246 is pivotally mounted is journalled through the bottom of arch 46 and an opposed wall thereof. Stud 248 is provided with a large flanged portion 250 at the top thereof. Flanged portion 250 is provided with a plurality of arcuate slots 251 to receive the heads of screws 252 by means of which flange 250 is secured to the wall of arch 46. Thus flange 250 may be secured in rotatably adjusted position. Since flange 250 is slightly eccentric with reference to the integral stud 248, such rotary adjustment of flange 250 has the effect of slightly shifting the center of stud 248 and varying the distance between the centers of pin 240 and stud 248, which distance must be closely adjusted to a value which prevents the arm of crank 246 and link 242 from lying in a straight line. This is necessary for the efficient functioning of the mechanism.

The other arm 254 of crank 246 is also bifurcated and the two portions thereof extend on opposite sides of a lead screw nut operating rod 256. An opening is provided in each portion of arm 254 to receive pins 258. Pins 258 are formed integrally with a pair of rectangular blocks 260 which engage transverse grooves 262 formed in the operating rod 256. From the above it should be apparent that a reciprocating movement of rod 256 will, through the connections 242 and 234 with the crank 246, cause the half-nuts 214 alternately to engage with and disengage from the threads on leadscrew 148.

As seen in Figures 6 and 8, rod 256 is journalled for reciprocation through bushings 264 which are mounted in aligned openings in opposed walls of arch 46. Rod 256 is adapted to be moved axially in one direction by manual means. To enclose such means and the forwardly protruding end of rod 256 a housing 266 and cover plate 268 are secured to the front of arch 46 by screws 270 (Figure 1). Journalled through the opposite sides of housing 266 is a shaft 272, through the enlarged, laterally protruding portion of which a lever 274 is passed for the manual rotation of said shaft.

Interiorly of housing 266 a lever 276 is secured upon shaft 272 by pin 278. Lever 276 is bifurcated to extend downwardly on opposite sides of the operating rod 256. Each side of lever 276 is provided with an opening to receive one of a pair of pins 280 which are formed integrally with rectangular blocks 282 (Figure 6). Blocks 282 engage opposed slots 284 in the rod 256. It is therefore apparent that oscillating movement of hand lever 274 in one direction will rotate shaft 272 and produce an axial movement of rod 256 to close the half-nuts 214 on leadscrew 148.

A manually operable adjusting screw 286 is threadedly engaged in cover plate 268 and abuts the forward end of rod 256 to provide the initial adjustment of the axial position of said rod. A lock nut 288 is provided to retain screw 286 in adjusted position. A detent 290 (Figure 8) is mounted in an opening 292 formed in the wall of arch 46 and perpendicular to the axis of rod 256. A plug 294 threaded into the outer end of opening 292 retains a spring 296 in compression between said plug 294 and detent 290. A recess 298 having an inclined surface on its forward side is formed on rod 256 adjacent detent 290. Thus detent 290 by engaging the inclined surface of recess 298 resiliently holds rod 256 in its forward position when the leadscrew nuts 214 are closed as shown in Figure 6.

The rearward end of rod 256 is threadedly attached to the piston rod of a hydraulic cylinder 300. As will be seen later, cylinder 300 is arranged to operate under pressure in one direction only, that is, it will move rod 256 rearwardly to open leadscrew nuts 214. A two-way hydraulic pilot valve 302 is secured by screws 304 to a plate 306. Plate 306 is mounted by bolts 308 to the bottom wall of arch 46 in such position that valve 302 may be operated by the inclined surface 310 formed near the rear end of rod 256. The purpose of valve 302 will be described later herein.

Chuck

The chuck for holding the couplings for tapping and the mechanisms associated therewith are shown in Figures 10 to 18 inclusive of the drawings. As best seen in Figures 12 and 13, the base 40 of the machine is provided with a pair of parallel transverse channels 312 in which hardened ways 314 are secured by screws 316. A length of roller chain 318 rests upon each way 314. A chuck carriage 320 has secured to the bottom thereof, by means of screws 322, a second pair of hardened ways 324 by means of which said carriage 320 is supported upon the rollers of chain 318.

It will therefore be apparent that carriage 320 is capable of movement transversely of the machine. A depending flange portion 326 of carriage 320 at the forward end thereof has a pair of set screws 328 threadedly engaged therein which abut the forward end of base 40 to adjustably limit the movement of carriage 320 in one direction. Locknuts 330 retain screws 328 in adjusted position. A pair of plates 332 are secured to the rear surface of carriage 320 by screws 334 (Figure 10). A set screw 336 is threadedly engaged in each plate 332 to abut the vertical surface 338 of base 40 and thereby adjustably limit the travel of carriage 320 in the forward direction. Locknuts 340 retain screws 336 in adjusted position. The chains 318 are retained between ways 314 and 324 by means of pins 342 embedded in each of said ways near the ends thereof.

The foregoing construction is only for the purpose of support and friction-free motion. The following elements are provided to retain carriage 320 on base 40 and to guide the movement of the former. Base 40 is provided with a pair of upwardly projecting guides 344 having internal guiding surfaces 346 and external guiding surfaces 348. Surfaces 346 are engaged by the sides of flanges 350 formed integral with chuck carriage 320. Surfaces 348 are engaged by a pair of plate 352 secured to the outward side surfaces of carriage 320 by screws 354. A pair of horizontal plates 356 are secured by screws 358 to the bottom surfaces of flange portions 350 to engage downwardly facing surfaces of guides 344 and thus to prevent carriage 320 from lifting or tilting.

Upwardly extending side portions 360 of carriage 320 provide a large rectangular opening in the interior of said carriage 320 in which the chuck is mounted. The chuck is, of course, arranged horizontally to hold the work pieces with their axes vertical, that is, parallel with the axis of the tap 50. It is essential, in order to obtain a condition of perfect alignment between tap and work and thus to cut a thread which will be coaxial with the exterior of the work, that the chuck be allowed to "float." That is, a certain amount of lateral movement of the chuck must be provided for, in order for the chuck to align itself with the spindle when the work is engaged by the tap.

Therefore, the chuck mechanism comprises the yoke 362 which is mounted within portions 360 of carriage 320 upon a plurality of thrust bearings 364 (Figure 15). Studs 366 pass vertically through bearings 364 and yoke 362 and each stud 366 is provided with an enlarged head 368 at the top thereof. A second thrust bearing 370 is interposed between head 368 on each stud and the top surface of yoke 362. Stud 366 also passes downwardly through an opening 372 in carriage 320. A part of opening 372 is counterbored to receive the coil spring 374 which surrounds stud 366 and is retained in compression between the bottom of the counterbore in opening 372 and a washer 376 by a pair of locknuts 378 threadedly engaged upon the lower end of stud 366. Thus, yoke 362 is not clamped rigidly upon the carriage 320 but is resiliently held between bearings 364 and 370 by stud head 368 and the action of spring 374. Excessive vertical movement of yoke 362 is prevented by the top plates 380 which are secured by screws 382 to the top surfaces of carriage portions 360 (Figures 10 and 15) and which extend inwardly to overlap a portion of yoke 362. Plates 380 also surround the stud heads 368 to prevent lateral movement thereof.

Studs 366 are further provided with spaced flange portions 384 which closely engage the bores of the upper and lower races of bearings 370 and 364 respectively, thus preventing lateral movement of said races. Lateral movement of yoke 362 and the inner races of bearings 364 and 370 which are closely fitted in openings in said yoke 362, is permitted by reason of the fact that the openings 386 in yoke 362 and the other races of bearings 364 and 370 through which stud 366 passes are made considerably larger than said stud.

Referring to Figure 11, a hydraulic cylinder 388 is mounted in an upwardly projecting bracket 390 which is formed as an integral part of the base 40. The piston rod of cylinder 388 extends forwardly and has a collar 392 retained thereon by the nut 394. Collar 392 is provided with a pair of flange portions 396 and 398 at the forward and rear ends thereof, respectively. Collar 392 passes through an open-end slot 400 in a depending lug 402 formed integrally with chuck carriage 320. It will be evident therefore, that the flanges 396 and 398 which are located on opposite sides of lug 402 will, upon the activation of cylinder 388, alternately engage the sides of said lug to move carriage 320 transversely. As before described, the limits of such movement are determined by the engagement of screws 328 with the forward surface of base 40 and, in the opposite direction, by the engagement of screws 336 with the base surface 338. The length of collar 392 between end flanges 396 and 398 is substantially greater than the thickness of the adjacent portion of lug 402, thus providing a lost-motion connection which permits carriage 320 to float a limited amount in the transverse direction on chains 318.

As shown in Figures 10 and 12, a key 404 is secured in a recess in the top surface of each side of yoke 362 by screws 406. Each key 404 is received in a mating keyway 408 in the lower surface of plate 380. Thus, chuck yoke 362 is free to float in the direction perpendicular to the direction of float of the carriage 320. The amplitude of lateral movement of yoke 362 is adjustably controlled by means of the cone-pointed set screw 410 which is threaded through one of the plates 380 (Figure 12) and which engages a conical recess 412 in the top surface of yoke 362. The adjusted clearance between the point of set screw 410 and the recess 412 determines the amount of movement possible. A lock nut 414 retains screw 410 in adjusted position.

The yoke 362 is U-shaped and the open end thereof is closed by a member 416 which is secured to said yoke 362 by screws 418 (Figure 10). Yoke end member 416 is provided with a cylindrical recess 420 (Figure 11) in the bottom of which a spacer 422 is seated to support the outer race only of a combination thrust and radial ball bearing 424 which is also mounted in the recess 420. The inner race of bearing 424 is journalled upon one end of a bushing 426, a flange portion 428 of which is also seated in recess 420.

The forward end of yoke 362 is provided with an opening 430 in which the anti-friction bearings 432 are mounted. A shaft 434 is journalled for rotation in bearings 432 and said bearings are retained in opening 430 by a flange portion 436 of shaft 434. Inwardly of flange 436, shaft 434 extends through one end of a chuck body member 438 and is keyed thereto by a pin 440. At the rearward end thereof, chuck body 438 is supported upon the bushing 426 and is secured thereto by screws 442. It is therefore apparent that chuck body 438 is rotatably mounted on yoke 362 and within the space enclosed by said yoke and end member 416. The forward end of shaft 434 is received in an opening in a hub 444 to which it is secured by a pin 446. A manually-operated handle 448 is secured in a rectangular slot 450 in the forward end of hub 444 by means of screws 452 (Figure 10). Handle 448 constitutes the means whereby chuck body 438 is rotated.

As seen in Figure 10, the chuck body 438 is also made in the form of a hollow rectangle, the interior of which is occupied by a pair of grip jaws 454 and 456. Jaw 454 is rigidly attached to the forward end of body 438 by screws 458. Jaw 456 is secured by screws 460 to one end of a block 462 which, in turn is secured by a pair of screws 464 to the forward end of the piston rod 466 of a hydraulic cylinder 468 (Figure 11). Cylinder 468 is mounted by means of screws 470 to the rearward end of yoke end member 416. It will be noted that piston rod 466 passes through member 416 and bushing 426 and is concentric therewith. Therefore, one chuck jaw, 454, is stationary with respect to chuck body 438 while the other jaw, 456, is movable toward and from the center of said body 438 by means of the cylinder 468.

The coupling W to be threaded is held in the center of chuck body 438 and between jaws 454 and 456 by means of a plurality of hardened tooth members 472 here shown as four in number, two on each jaw. Each tooth member 472 is formed with a series of parallel V-shaped serrations 474 on the back surface thereof which mate with similar serrations formed on a surface of the chuck jaw. These serrations are held in mesh by means of a clamp 476 which is mounted by means of a screw 478 in a recess 480 in the chuck jaw. Square serrations 482 are formed on the oblique end of clamp 476 which mesh with similar grooves in the face of tooth number 472 to prevent the latter from moving vertically. A compression spring 484, seated in a counterbore in the chuck jaw and surrounding screw 478, urges clamp 476 outwardly to quickly disengage serrations 482 when screw 478 is loosened. A stud 486 and nut 488 prevent movement of the heel of clamp 476 and keep serrations 482 engaged when screw 478 is tightened. It will be evident that the tooth member 472 may be adjusted toward and from the center of the chuck body 438 by means of serrations 474 so that the work W will be securely gripped and approximately centered in the chuck. It will be understood that the chuck jaws 454 and 456 are replaceable for different sizes of couplings to maintain the axes of such couplings coincidental with the center of the chuck.

The upper and lower sides of chuck body member 438 and a large portion of chuck jaws 454 and 456 are covered by plates 490 which are secured to said body member by screws 492. Plates 490 are provided for the purpose of protecting the face of the chuck from damage and for preventing the entry of chips and cuttings into the mechanism of the chuck, particularly in the vicinity of the moving jaw 456.

The chuck body 438 is made rotatable as above described so that, when one end of the coupling has been tapped the entire chuck, with the coupling firmly gripped, may be rotated 180° to present the opposite end of the coupling to the tap on substantially the same axis. Except during such rotation, the chuck should be fixed in a horizontal position to keep the axis of the coupling exactly vertical. This is accomplished in the following manner.

At each side of its rotational axis, a rectangular recess 494 is formed in the rear surface of body member 438. As seen in Figure 14, a block 496 is secured in one side of each recess 494 by screws 498. A second block 500 having an inclined surface opposed to the block 496 is secured in the opposite side of recess 494 by screws 502.

A hydraulic cylinder 504 is secured by screws 506 to the rearward surface of end member 416 and is located laterally adjacent the cylinder 468. A bushing 508 is attached by screw 510 upon the forward end of the piston rod 505 of cylinder 504. Bushing 508 extends into a recess 512 in the rearward end of a locking bolt 514 and is retained therein by a member 516 which loosely surrounds said piston rod rearwardly of bushing 508 and is threadedly engaged in recess 512. A set screw 518 is provided to engage the external threads of member 516 in a radial direction and thereby prevent any undesired movement thereof.

The cylindrical lock bolt 514 is mounted for axial movement in a bushing 520 which, in turn, is frictionally fitted in a bore 522 in end member 416 which bore is formed concentrically with cylinder 504. A cap screw 524 passes through member 416, is threadedly engaged in a wall of bushing 520 and extends into a keyway 526 in lock bolt 514 to prevent rotation of the latter. Lock bolt 514 is formed with a wedge-shaped forward end portion 528 which is designed to enter the space between blocks 496 and 500. When in this position, lock bolt 514 will hold chuck body 438 exactly horizontal. It will be apparent that the axial position of lock bolt 514 is determined by the activity of the cylinder 504.

A lever operated two-way hydraulic valve 530 is mounted in base 40 as shown in Figure 18. The stem of valve 530 has mounted thereon an operating headspool 532 which is pivotally connected by pins 534 with one arm of a bell crank 536. Crank 536 is pivotally mounted by means of pin 538 on a bracket 540 which is secured to a vertical web 542 of base 40 by screws 544. The other arm of crank 536 extends forwardly over the top of web 542 and has attached at the end thereof, by means of a pin 546, a roller 548. A cam plate 550 is secured by screws 552 to the inwardly facing surface of the right hand carriage guide plate 356 (Figure 12). As carriage 320 is moved rearwardly, the inclined surface 554 strikes roller 548, rotating crank 536 to move the piston of valve 530 toward the right as seen in Figure 18. When carriage 320 is moved forward, cam 550 will release roller 548 and the piston of valve 530 will move toward the left under the impetus of the spring contained therein. The purpose of actuating valve 530 by the movement of carriage 320 will appear later herein.

It has been noted that the rearward limit of the travel of carriage 320 is such as to dispose the work piece in exact vertical alignment with tap 50 for the threading operation. The carriage is shown in this position in Figure 11. The forward limit of travel of carriage 320 is such as to dispose the work piece above and in exact vertical alignment with the center of a work locating plate 555. This position of carriage 320 is illustrated in Figure 12. The function of work locating plate 555 and its operating mechanism is manifold. At the conclusion of an operation upon both ends of a coupling, plate 555 supports the coupling after its release from the chuck, lifts the coupling to the top of the chuck for easy removal, returns downwardly to rest at a position which will support the next unthreaded coupling at the required distance from the tap, and finally, moves downwardly out of the chuck to permit the carriage to move rearwardly.

The mechanism for performing the above functions is shown in Figures 11, 12, 16 and 17. In Figure 12, plate 555 is shown in locating position. That is, the plate 555 has been extended into the chuck to support a work piece W at the proper distance from tap 50. Plate 555 is mounted upon a flanged bushing 556 and is secured thereto by screws 558. A pin 560 is employed to key the bushing 556 to a vertical shaft 562 which is mounted for axial movement in a tubular member 564. Member 564 is mounted in aligned openings in a housing member 566. An integral flange portion 568 of member 564 is provided and screws 570 secure said flange 568 to housing 566 which is, in turn, secured in a suitable recess in the front of base 40 by means of screws 572.

A series of rack teeth 574 are formed along one side of shaft 562. A portion of the wall of tubular member 564 is cut away to permit rack teeth 574 to be engaged by a spur gear 576. Gear 576 is formed integrally with a co-axial pinion 578 (Figure 11). Both gear 576 and pinion 578 are journalled on a stud shaft 580 which is mounted in the rear wall of housing 566 and is stationarily retained therein by a set screw 582. A cam 584 is secured by screws 586 to the forward surface of gear 576 and cam 584 together with gears 576 and 578 are retained on stud 580 by a collar 588 and locknut 590 which latter is threadedly engaged on the forward end of stud shaft 580.

Pinion 578 is in constant mesh with the rack teeth 592 formed along one side of a cylindrical bar 595. Bar 594 is disposed horizontally in a suitable bore in housing 566 and extends therefrom at one end (Figure 12). A hydraulic cylinder 596 is mounted by means of screws 598 to base 40 and is so disposed that the piston rod 600 thereof may be threadedly engaged in the end of bar 594. A nut 602 prevents accidental disconnection of piston rod 600 and bar 594. It is therefore apparent that the reciprocation of the piston of cylinder 596 causes vertical reciprocatory movement of shaft 562 and locating plate 555.

The locating mechanism is controlled by a servo valve 604 which is mounted in base 40 by means of screws 606. As is known in the art, the movement of a hydraulic cylinder connected to such a valve is controlled by the movement of a plunger shaft 608 while the cylinder movement is stopped by the movement of a sleeve shaft 610 which is mechanically connected to the cylinder. One example of this type of valve is described in "Hydraulics as Applied to Machines," copyright 1941, by Henry Ford Trade School, Dearborn, Michigan. As shown in Figure 167 of this publication in the inward movement of plunger shaft 608 the valve piston is moved a proportional amount to control fluid flow and an internal spring is thereby placed under compression, which urges the sleeve shaft 610 outwardly. In this case, sleeve shaft 610 is connected by pin 612 to link 614. A pin 616 connects link 614 to one arm of a bell crank 618. Crank 618 is pivotally mounted on a pin 620 which is disposed through a convenient portion 622 of housing 566. A key 624 seated in a recess in portion 622 and secured thereto by a screw 626 prevents rotation of pin 620. The second arm of crank 618 is provided with a pin 628 on which a cam follower roller 630 is mounted. Roller 630 is disposed in cooperative relation to the spiral cam 584 mounted on shaft 530.

The plunger shaft 608 has pinned thereto a roller 632 which cooperates with a cam 634 to move shaft 608 axially. Cam 634 is pivotally mounted by means of pin 636 on one end of the housing of valve 604. A lever 638 is formed integrally with cam 634 and is attached by pin 640 to a link 642. The opposite end of link 642 is connected by pin 644 to one end of a lever 646. Lever 646 is mounted on a shaft 648 and is attached thereto for unitary rotation by a pin 650 (Figure 16). Shaft 648 is journalled through a pair of aligned bushings 652, 654 frictionally mounted in base 40. Shaft 648 is provided with a flange portion 656 at its forward end to prevent axial movement of said shaft.

A circular plate 658 surrounds flange 656 and is disposed against the forward wall of base 40 where it is held in position by a clamping ring 660 which engages a flange 662 formed on the circumference of said plate. Ring 660 is secured to the wall of base 40 by screws 664. The forward end of flange 656 is provided with a keyway 666 to receive mating rectangular projections 668 formed on the side flanges of a bracket member 670 which is secured to the end of flange 656 by screws 672. Bracket 670 is of U-shaped construction and encloses a lever 674 which is intermediately fixed to a pin 676 journalled through opposite sides of bracket 670. A handle 678 is inserted in an opening in one end of lever 674 and is retained therein by a pin 680 for manual operation of said lever (Figure 17).

The rearward surface of lever 674 below pivot 676 is provided with a projection 682 which is adapted to engage a radial slot 684 in the forward surface of plate 658. A spring 686 and detent 688 are disposed in an opening in lever 674. Detent 688 engages the forward wall of bracket 670 to compress spring 686 and thus urge projection 682 into slot 684 when the radial position of these elements coincide to permit their engagement.

It will be apparent that handle 678, lever 674, bracket 670 and shaft 648 are rotatable as a unit. A fixed stop 690 is provided on the forward surface of ring 660 to limit rotation of lever 674 in the counter-clockwise direction as seen in Figure 12. A lug 692 having a set screw 694 threadedly engaged therein is also formed integrally with ring 660. The screw 694 therefore serves as an adjustable stop to limit rotation of lever 674 in the clockwise direction. The stop 690, as will be seen more fully hereinafter, defines the lowermost or rest position of work locating plate 555; the adjustable screw 694 defines the uppermost limit of travel of plate 555; and the slot 684 in plate 658 defines the intermediate or work locating position of locating plate 555. It is therefore desirable that the position of slot 684 relative to stop 690 be made adjustable. It will be evident that such adjustment may be made by rotating the plate 658 relative to ring 660. This may be done only when the screws 664 are loosened to permit free rotation of plate 658, after which screws 664 may be retightened to retain plate 658 securely in adjusted position. A scale 696 is engraved on ring 660 and an index line 698 is provided on the adjacent portion of plate 658 to facilitate the above-described adjustment.

A two-way hydraulic valve 700 is attached by means of screws 702 to housing 566 adjacent member 564 (Figure 12). Valve 700 is operated by a lever 704 which is pivoted at one end to housing 566 by a screw 706 and through the opposite end of which a set screw 708 is threaded. The vertically disposed screw 708 is retained in adjusted position by a nut 710. Directly above screw 708, a rod 712 is mounted in a portion of housing 566 and flange 568. A spring 714 is disposed in an opening 716 to surround a portion of rod 712. Rod 712 is provided with a flange 718 which retains spring 714 in opening 716 and which also limits the axial movement of rod 712 in the upward direction by engaging the bottom surface of flange 568 of member 564 through which rod 712 is movable. The upper end of rod 712 extends upwardly from flange 568 so that when locating plate 555 is lowered, the flange of bushing 556 will depress said rod 712, compressing spring 714 and finally, moving lever 704 downwardly a short distance to operate valve 700.

The above described work locating mechanism is enclosed by cover plates 720, 722 and 724 which are affixed to the front of base 40 by screws 725 (Figure 1).

Additional elements of the control system are illustrated in Figures 19 to 24 inclusive. The left side of gear box 48 (as seen in Figure 1) is provided with a vertical rectangular groove 728 (Figure 23), in which a dovetail guide 730 is secured by screws 732. Guide 730 is engaged on opposite sides by inclined grooves in a cam member 734 and a clamp member 736. Members 734 and 736 are clamped in any desired position on guide 730 by screws 738 (Figure 22). Cam 734 is provided, near the bottom thereof, with an oblique camming surface 740 which faces toward the front of the machine.

Below cam 734 and clamp 736, a second pair of elements comprising a cam 742 and clamp 744 are mounted upon the same guide 730 by a screw 746. Cam 742 is provided, near the top thereof with an oblique camming surface 748 which faces in the direction opposite that of surface 740 on cam 734. It should be apparent that cams 734 and 742 are independently adjustable vertically along guide 730. Such adjustment is made by loosening screws 738 and 746, moving the cams and clamps to the desired position and retightening said screws.

The function of cams 734 and 742 is that of operating a lever 750 through a roller 752 which is secured to the end of said lever 750 by a pin 754 (Figure 19). Lever 750 is mounted upon a shaft 756 and is secured thereto by any conventional means. The shaft 756 is journalled in a pair of shouldered bushings 758 and 760 which are mounted in the inner and outer walls, respectively, of the left hand column member 42. A collar 762 is secured upon shaft 756 by a pin 764 and is disposed inwardly adjacent bushing 758 to prevent axial movement of the shaft 756 and the members carried thereby.

In the interior of column 42 a lever 766 is secured upon shaft 756 by means of a pin 768. The outer end of lever 766 is bifurcated to extend on opposite sides of a valve operating member 770 which is threadedly engaged upon the stem of a valve 772. A pair of pins 774 are pivotally fitted in the opposed arms of lever 766 and have formed integrally therewith rectangular blocks 776. Blocks 776 engage slots in opposite sides of member 770 to translate rotary motion of shaft 756 and lever 766 to axial movement of member 770, thereby operating valve 772. To support valve 772, studs 778 are threaded into the wall of column 42 and valve 772 is secured to said studs 778 by cap screws 780. It should be noted that lever 750 is also provided with a handle 781 for manual operation of valve 772.

The right hand side of gear box 48 is also provided with a vertical rectangular slot 782 (Figure 2) in which a key formed on the rear surface of a cam element 784 is fitted. Cam 784 is secured to the side of gear box 48 by screws 786 (Figure 24). Longitudinal slots 788 in cam 784, through which screws 786 pass, permit a limited amount of vertical adjustment of the cam 784. Cam 784 is formed with two projections 790 and 792, having oppositely facing oblique cam surfaces 794 and 796 respectively.

The function of cam surfaces 794 and 796 is the operation of a lever 798 (Figure 20) through a roller 800 which is attached to said lever 798 by a pin 802. Lever 798 is mounted upon a shaft 804 and is secured thereto by a pin 806 (Figure 21). The shaft 804 is journalled in a pair of shouldered bushings 808 and 810 which are mounted in the inner and outer walls, respectively, of the right hand column member 44. A collar 812 is affixed on shaft 804 inwardly adjacent bushing 808 by means of pin 814 to prevent axial movement of shaft 804 and the elements supported thereby.

In the interior of column 44 a lever 816 is secured upon shaft 804 by a pin 818. Lever 816 is bifurcated to extend on opposite sides of a valve operating member 820 which is threaded on the stem of a hydraulic valve 822. Member 820 is formed with flange portions 824 on each end thereof. Flanges 824 are engaged by lever 816 to translate rotary movement of shaft 804 and lever 816 into axial movement of the stem of valve 822. To support valve 822, studs 826 are threaded into the wall of column 44 and valve 822 is secured thereto by screws 828.

A handle 830 (Figure 21) is inserted in one side of lever 798 and is affixed thereto by a pin 832 for manual operation of valve 822. Lever 798 is further provided with a pair of upwardly projecting ears 834 and 836 which alternately engage a pin 838 mounted in the wall of column 44, to limit the rotation of lever 798 and shaft 804 in both directions. An adjacent vertical wall of column 44, perpendicular to the walls through which shaft 804 is journalled, has formed therein a boss 840. A bushing 842, having a flange portion 844 is mounted in boss 840 and is secured thereto by screws 846. A detent 848 having a wedge-shaped point is mounted for axial sliding movement in bushing 842. Rotation of detent 848 is prevented by a pin 850 which is fitted in bushing 842 and projects therefrom into a slot 852 in detent 848.

The rearward end of bushing 842 is closed by a plug 854 which is threadedly engaged therein. The detent 848 is substantially hollow to receive a coil spring 856 which is held in compression between detent 848 and plug 854 and consequently urges detent 848 outwardly toward lever 798. A pin 858, also having a wedge-shaped point is frictionally fitted in lever 798 and projects therefrom toward detent 848. It will be apparent that the camming action between the points of detent 848 and pin 858, together with the force of spring 856 will permit lever 798 to come to rest only in one of two positions, that is, with pin 858 above detent 848 or below the detent as shown in Figure 21. The importance of this mechanism will be more evident later.

Operation

The hydraulic system for operating the machine is shown diagrammatically in Figure 25. Hydraulic fluid is drawn from a reservoir or tank 860 by a pump 862, and is delivered thereby into the main pressure line 864. A relief valve 866 is installed in line 864 for the purpose of delivering the pump output directly to the tank 860 if the pressure in the line rises above the value for which said valve is set. A sequence valve 868 is next installed in line 864. The entire output of pump 862 passes through valve 868 until the pressure in line 864 rises above a predetermined value for which valve 868 is adjusted, whereupon the fluid is delivered into line 870.

With the machine at rest, the work locating mechanism control handle 678 will be in the position shown in Figure 1, with lever 674 in contact with stop 690. At the same time, chuck carriage 320 will be in its forward or loading position. With carriage 320 in this position, crank 536 is released and valve 530 is open. Fluid will then pass from line 870 through valve 530, line 872, check valve 874, servo valve 604 and line 876 into the right hand end of cylinder 596. Thus rod 594 is held at the leftward limit of its stroke and shaft 562 (Figure 12) is held at its lowermost position. In this position, work locating plate 555 operates to close valve 700 and pressure is conducted from line 870 through valve 700 and line 878 to the left hand end of pilot operated valve 880.

This setting of valve 880 permits fluid from line 870 to pass through valve 880, line 882, combination hand and pilot operated valve 884, and line 886 to the rear end of cylinder 338. Thus chuck carriage 320 is held in its forward position. Fluid passes from line 864 through a metering valve 888 which is used to regulate the pressure of the fluid passing through said valve 888 to a combination hand and pilot operated valve 890. Valve 890 should be set initially to deliver fluid through line 892 and flow control valve 894 to the forward end of the chuck jaw cylinder 468, thereby holding the chuck jaws open and ready for the insertion of a work piece.

A combination hand and pilot operated valve 896 should initially be set to permit hydraulic fluid to flow from line 870 through valve 896 and line 898 to the rearward end of lock bolt cylinder 504, thereby holding lock bolt 514 in engagement with the chuck and preventing its rotation. The hand and lever operated valve 772 is initially held by cam 742 in its central or closed position. As a result, fluid is trapped in cylinder 108 and no motion of gear box 48 is possible. Cam 742 is in operation only when the gear box 48 has reached its uppermost position as shown in Figures 1, 3 and 9.

The first step in the operation of the machine is to bring the locating plate 555 upward until it is level with the top of the chuck so that a heavy coupling may be loaded thereon with ease. To accomplish this, handle 678 is moved in a clockwise direction until it is stopped by the screw 694 (Figure 12). This rotates cam 634, forcing plunger shaft 608 into the servo valve 604. As a consequence, fluid is cut off from line 876 and is permitted to flow from line 870 through valve 530, line 872, valve 874, valve 604 and line 904 to the left end of cylinder 596, to move rack bar 594 toward the right. Simultaneously, line 876 is connected through servo valve 604 to line 906 which leads back to the reservoir 860.

As seen in Figure 12, movement of rack bar 594 toward the right causes pinion 578 and gear 576 and cam 584 to rotate in a clockwise direction. Rotation of gear 576 causes shaft 562 and locating plate 555 to move upwardly through the chuck. Due to the known characteristics of servo valve 604, sleeve shaft 610 is at this time being urged outwardly, being restricted by its connection to crank 618 whose position is dictated by the position of cam 584. Rotation of cam 584, therefore, permits crank 618 to rock in a clockwise direction and sleeve shaft 610 is allowed to emerge from valve 604. Such axial motion of sleeve shaft 610 will continue until its amount is equal to the amount plunger shaft 608 has been depressed. At this point, pressure to cylinder 596 will be cut off by servo valve 604 and the mechanism will stop in the desired position.

It will be noted that the rise of plate 555 releases lever 704, opening valve 700 to permit fluid to pass from line 870 through valve 700 and line 912 to the right hand end of valve 880, while the pressure in line 878 to the left hand end of valve 880 is simultaneously cut off. Thus the position of the plunger of valve 880 is reversed to close the passage to line 882. Movement of chuck carriage 320 is thus prevented until plate 555 returns to its rest position. Obviously, movement of the carriage while the work plate protrudes into the chuck would damage the machine.

A coupling blank will now be placed upon the plate 555 and handle 678 is rotated in a counterclockwise direction until the projection 682 on lever 674 engages the slot 684. Thus cam 634 is rotated, allowing plunger shaft 608 to emerge from servo valve 604. This reverses the direction of flow in servo valve 604 so that fluid passes from line 870 through valve 530, line 872, valve 874, servo valve 604 and line 876 to the right hand end of cylinder 596. Consequently rack bar 594 is moved laterally toward the left, moving the now loaded plate 555 downwardly. When the coupling W reaches the correct gripping position shown in Figure 12, cam 584 has rotated sufficiently to force sleeve shaft 610 into servo valve 604 a distance equal to the distance which plunger shaft 608 has previously emerged. At this point, the servo valve 604 is again closed and no more fluid is delivered to cylinder 596, stopping plate 555 in the correct location.

The next step is to close the chuck grips upon the work piece. This step is initiated by manually operating valve 890 so that fluid is permitted to pass from line 864 through pressure control valve 888, valve 890 and line 908 to the rearward end of cylinder 468 to move chuck jaw 456 toward the stationary chuck jaw 454 and grip the coupling W therebetween. Valve 888 is adjustable so that the gripping pressure may be regulated to suit the requirements of a particular size of coupling. The counterbalance valve 894 is provided to control the flow from the forward end of cylinder 468 so that the advance of chunk jaw 456 is not too violent. Further, valve 894 maintains a high pressure in lines 908 and 870 to retain plate 555 in position while the coupling is being gripped.

Loading plate 555 is then lowered to its rest position, shown in Figure 11, by rotating handle 678 in the counterclockwise direction until lever 674 contacts the stop 690. By a repetition of the activity of servo valve 604 described above, plate 555 is lowered to the rest position.

Next, the valve 884 is manually operated to permit fluid to pass from line 870 through valve 880, line 882, valve 884 and line 910 to the forward end of cylinder 388. Thus chuck carriage 320 is caused to move rearwardly. The rearward end of cylinder 388 is connected through line 886 and valve 884 to the tank line 906. This movement of chuck carriage 320 causes cam 550 to rock crank 536, closing valve 530 and cutting off the pressure to servo valve 604. Therefore, while carriage 320 is in tapping position, no operation of the work locating mechanism is possible.

When carriage 320 has stopped, by means previously explained, to position the coupling in alignment with tap 50, the gear box 48 and tap 50 may be lowered to close proximity to the coupling to be tapped. This is accomplished by manually operating the lever 781, which as above explained, operates valve 772. Fluid is then permitted to pass from line 870 through valve 772 and line 914 to the upper end of cylinder 108. The lower end of cylinder 108 is connected through line 900, valve 902, and valve 772 to the exhaust line 906. Gear box 48 and tap 50 therefore move downwardly until cam 734 operates lever 750 to center the plunger of valve 772. Since valve 772 is a closed center type valve, both lines 900 and 914 are closed and the downward movement of the tap stops.

The leadscrew nuts 214 are engaged upon the leadscrew 148 by manual operation of the handle 274. Outward movement of handle 274 rocks lever 276 in a counterclockwise direction, moving rod 256 forwardly. Thus, by means of the previously described linkage (Figure 6) from lever arm 254 to the cranks 218 and 220, leadscrew nuts 214 are closed and the tap 50 is thereby advanced at the proper rate to cut the desired thread. As tap 50 descends, gear box 48 must necessarily also descend. As a result, the piston of cylinder 108 forces fluid from the lower end of cylinder 108 through relief valve 902, line 916, check valve 918 and line 914 to the upper end of the cylinder 108, where a vacuum has been created by the descent of the piston rod. Additional fluid is drawn from tank line 906 through check valve 920 to occupy a volume in the upper end of cylinder 108 equivalent to that occupied by the piston rod in the lower end.

It should be noted that the operation of valve 302 by rod 256 as the leadscrew nuts are manually closed, opens said valve, permitting fluid to pass from line 870 through valve 302 and line 922 to the right hand side of each of the valves 884, 890 and 896. This prevents the manual operation of these valves and precludes the possibility of accidental release of the lock bolt 514, opening of chuck jaw 456, or movement of chuck carriage 320 during the tapping operation.

As the tapping operation is concluded, the tap automatically collapses. The cam surface 794 of cam 784 is adjusted to operate lever 798 immediately after the collapse of the tap. The resultant operation of valve 822 permits fluid to pass from line 870 through valve 822, line 924 and metering valve 926 into the forward end of cylinder 300 whereby rod 256 is drawn rearwardly to open the leadscrew nuts. This movement of rod 256 also closes valve 302, removing the hydraulic pressure on valves 884, 890 and 896 permitting their operation as necessary.

Lever 781 is then operated manually to permit fluid to pass from line 870 through valve 772 and line 900 into the lower end of cylinder 108. The upper end of cylinder 108 is connected through line 914 and valve 772 to the exhaust line 906. Consequently gear box 48 and tap 50 move upwardly. At the end of such movement, cam 742 operates lever 750 to center the piston of valve 772 and thus close lines 900 and 914 to stop the rise of gear box 48 and tap 50 and to hold them in raised position. During the rise of gear box 48 the cam surface 796 of cam 784 has again closed valve 822 and opened the connection with exhaust line 906, so that no pressure exists in the leadscrew nut operating cylinder 300. The hydraulic fluid is exhausted from cylinder 300 through check valve 942, line 924, valve 822 and line 906 to the reservoir 860. Fluid leaking past the piston into the opposite end of the cylinder is returned to the reservoir through line 944. The tap will be reset when the tap is lifted as previously described. In case of emergency, during the threading operation, the feeding action of the lead screw may be instantly interrupted by operation of handle 830.

Valve 896 is now manually operated to permit fluid to pass from line 870 through valve 896 and line 928 to the forward end of the lock bolt cylinder 504. Lock bolt 514 is therefore withdrawn from its seat and the chuck is free to rotate. The rearward end of cylinder 504 is connected through line 898 and valve 896 to exhaust line 906. The chuck may now be rotated 180° by means of handle 448 to reverse the work end for end and bring the unthreaded end thereof into threading position. The chuck is then relocked by reversing the position of valve 896 to supply pressure to the rear end of cylinder 504 through line 898. From this point, the operations of lowering the tap, engaging the leadscrew nuts, collapsing the tap, disengaging the leadscrew nuts and raising the tap, proceed exactly as above described, in order to thread the second end of the work piece.

After the gear box 48 and tap 50 are stopped at the top of their stroke and the tap re-set for the second time, the valve 884 is manually operated to permit fluid to pass from line 870 through valve 880, line 882, valve 884 and line 886 to the rearward end of cylinder 388. The forward end of cylinder 388 is connected through line 910 and valve 884 to exhaust line 906. Therefore chuck carriage 320 is moved forward, releasing crank 536 which opens valve 530 to permit fluid to enter the servo valve system.

The loading plate 555 is then raised in the manner previously described to its intermediate or locating position. Valve 890 is operated to permit fluid to pass from line 864, valve 888, valve 890, line 892 and valve 894 to the forward end of cylinder 468. The rearward end of cylinder 468 is connected at the same time through line 908 and valve 890 to tank line 906. Cylinder 468 thus opens the chuck and coupling W is deposited on the locating plate 555. The plate 555 carrying coupling W may now be raised to the level of the top of the chuck, where the finished coupling may easily be removed and replaced by an unthreaded coupling, after which the cycle may be repeated as before.

Operation of the spindle motor 112 may be entirely conventional, a control panel 930 being installed on column 44 for the control of this and other necessary motors of the machine, such as a lubrication pump motor, etc. Speed change levers 932, 934 and clutch lever 936 are also provided for gear box 48. An electric switch 938 may be attached to column 44 for operation by a dog 940 on the side of gear box 48. Switch 938 is installed in the spindle motor circuit to open said circuit and stop motor 112 if the tap 50 descends too far, due to either the failure of the tap to collapse or the failure of the leadscrew nuts to disengage.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a metal working machine, a vertically reciprocating spindle carrying a work fashioning tool, a horizontally reciprocable carriage a work holding chuck mounted on said carriage for movement therewith from a work receiving position to a position in axial alignment with said spindle, hydraulically actuated means operatively connected with said carriage for moving the chuck to and from the latter position, said chuck including a movable section hydraulically actuated means connected to said chuck section and operable to open and close said chuck, a manually operable fluid supply control means individual to each of said hydraulically actuated means, means rotatably driving said spindle, a lead screw rigidly connected to said spindle means releasably connectible with the lead screw thread to axially move the same and said spindle in one direction and advance the tool to the work, actuating means operatively connected to said last named means, and means hydraulically interconnected with each of said control means responsive to the operation of said actuating means to connect said releasably means with the lead screw, to establish a hydraulic interlock between said individual control means and retain said work holding chuck in fixed closed position and in aligned relation with the spindle during advancing movement of the tool.

2. A metal working machine as defined in claim 1, said actuating means including a member manually operable in one direction to connect said releasable means with the lead screw, hydraulically operated means connected with said member and means interconnected with said responsive means and operated by means moving with the spindle to control operation of said member by said hydraulically operated means in the opposite direction and disconnect said releasable means from said spindle to limit advancing movement of the tool and to release the hydraulic interlock on said individual control means.

3. A metal working machine as defined in claim 1, wherein said chuck is indexible about a horizontal axis, together with hydraulically actuated means directly coacting with and locking the chuck in indexed position and a manually operable control means therefor, and a hydraulic interlocking connection between said latter control means and said first named control means to prevent operation of the chuck locking means during advancing movement of the tool.

4. In a metal working machine, a vertically reciprocating spindle carrying a work fashioning tool, a work holding chuck, a lead screw rigidly connected with the spindle, a nut releasably engageable with the lead screw to axially move the spindle in one direction and advance the tool to the work, actuating means operatively connected to said nut, means connected with a movable part of the chuck and operable by fluid pressure to open and close said chuck, a fluid pressure supply system connected with said last named means, and means responsive to operation of said actuating means to connect said nut with the lead screw to lock said chuck in closed position, comprising a valve in said fluid pressure supply system coacting with and operated by a part of said actuating means.

5. In a metal working machine, a vertically reciprocating spindle carrying a work fashioning tool, a work holding chuck indexible about an axis perpendicular to the spindle, a lead screw rigidly connected to the spindle, a nut releasably engageable with the lead screw to axially move the spindle in one direction and advance the tool to the work, actuating means for said nut, a member releasably coacting with said chuck to lock the chuck in indexed position, a fluid pressure operating system for said member, a manually operable valve therein controlling operation of said locking member, and additional valve means in said system operatively connected to said manually operable valve and coacting with a part of said actuating means when operated to connect said releasable means with the spindle, to lock said manually operable valve against actuation and prevent operation of said locking member to chuck releasing position.

6. A metal working machine as defined in claim 5, together with fluid pressure operated means in said system connected with a movable part of the chuck to open and close said chuck, and an independent manually operable control valve therefor connected with said additional valve means whereby operation of the latter valve means simultaneously locks said control valve against actuation to retain the chuck in closed position.

7. In a metal working machine, a horizontally positioned work holding chuck, means for locating a workpiece in and removing the same from said chuck, including a vertically movable work receiving and supporting plate normally positioned below the chuck, a power operated member, motion transmitting mechanism operatively connecting said member with said plate for vertically moving said plate relative to the chuck, and means controlling the operation of said power operated member to sequentially move said plate upwardly through the chuck to support a work piece above the chuck, then downwardly to locate a workpiece within the chuck to be gripped thereby, and finally downwardly to a position of rest below the chuck, said last named means comprising a control unit in the power supply line for said member having a movable member, and means for conditioning said unit including an adjustable element coacting with said movable member, and manually operable adjusting means connected with said element.

8. A metal working machine as defined in claim 7 wherein said power operated member is hydraulically actuated and said control unit comprises a servo-valve in the hydraulic circuit.

9. In a metal working machine having a rotatable vertically movable tool carrying spindle, a work supporting and locating plate mounted for vertical movement in laterally spaced relation from said spindle, a carriage mounted for movement in a path perpendicular to said spindle and having a work holding chuck mounted thereon, power operated means connected with said carriage to reciprocate it and position the chuck in axial alignment with said spindle or work supporting plate, power operated mechanism including a member connected to said plate to vertically adjust the position thereof relative to said chuck, a power supply control unit for said plate operating mechanism, and means cooperatively associated with said unit including a member manually operable to condition said unit and effectively operate said mechanism to vertically move said plate upwardly through the chuck to receive a workpiece, then downwardly to position the workpiece within the chuck to be gripped thereby and finally to a normal position of rest below said chuck.

10. A metal working machine as defined in claim 9, together with a device connected with said control unit and an operating member therefor engaged and actuated by said carriage in the movement to align the chuck with said spindle, said device being operative to render said control unit ineffective to supply operating power to said mechanism.

11. A metal working machine as defined in claim 9, together with power supply means connected to said carriage reciprocating means including a control device having an operating member therefor engaged and actuated by said plate when moved to its normal position to condition said power supply means for the transmission of operating power to said carriage reciprocating means.

GEORGE E. HIEBER.

References Cited in the file of this patent

UNITED STATES PATENTS

| Number | Name | Date |
|---|---|---|
| 252,068 | Walwerth | Jan. 10, 1882 |
| 377,400 | Miller | Feb. 7, 1888 |
| 871,069 | Scholz | Nov. 12, 1907 |
| 1,028,526 | Baerwilde | June 4, 1912 |
| 1,085,697 | Neckerman | Feb. 3, 1914 |
| 1,200,982 | Quartieri | Oct. 10, 1916 |
| 1,567,766 | Stacy | Dec. 29, 1925 |
| 1,707,421 | Wilson | Apr. 2, 1929 |
| 1,764,717 | Fownes | June 17, 1930 |
| 1,817,552 | Galloway | Aug. 4, 1931 |
| 1,862,668 | Eldridge | June 14, 1932 |
| 1,909,767 | Johnson | May 16, 1933 |
| 1,919,420 | Edwards | July 25, 1933 |
| 1,924,594 | Blood | Aug. 29, 1933 |
| 2,054,029 | Benninghoff | Sept. 8, 1936 |
| 2,160,476 | Kampmeier | May 30, 1939 |
| 2,160,674 | Procunier | May 30, 1939 |
| 2,206,031 | Drissner | July 2, 1940 |
| 2,279,462 | Holland | Apr. 14, 1942 |
| 2,356,087 | Prokul | Aug. 15, 1944 |
| 2,370,294 | Dodge | Feb. 27, 1945 |
| 2,381,441 | Drissner | Aug. 7, 1945 |
| 2,500,540 | Graves | Mar. 14, 1950 |
| 2,509,056 | Gartner | May 23, 1950 |